(12) United States Patent
Fukunaga et al.

(10) Patent No.: US 9,976,637 B2
(45) Date of Patent: May 22, 2018

(54) ROTARY ELECTRIC COMPONENT

(71) Applicant: TOKYO COSMOS ELECTRIC CO., LTD., Kanagawa (JP)

(72) Inventors: Taro Fukunaga, Kanagawa (JP); Hajime Fukushima, Kanagawa (JP)

(73) Assignee: TOKYO COSMOS ELECTRIC CO., LTD., Zama-shi, Kanagawa (JP)

( * ) Notice: Subject to any disclaimer, the term of this patent is extended or adjusted under 35 U.S.C. 154(b) by 175 days.

(21) Appl. No.: 14/914,990

(22) PCT Filed: Sep. 5, 2013

(86) PCT No.: PCT/JP2013/005264
§ 371 (c)(1),
(2) Date: Feb. 26, 2016

(87) PCT Pub. No.: WO2015/033373
PCT Pub. Date: Mar. 12, 2015

(65) Prior Publication Data
US 2016/0201774 A1 Jul. 14, 2016

(51) Int. Cl.
| F16H 21/06 | (2006.01) |
| F16H 21/44 | (2006.01) |
| H01H 3/08 | (2006.01) |
| H01H 19/14 | (2006.01) |
| H01H 3/02 | (2006.01) |
| H01H 19/11 | (2006.01) |

(52) U.S. Cl.
CPC ............ *F16H 21/06* (2013.01); *F16H 21/44* (2013.01); *H01H 3/0213* (2013.01); *H01H 3/08* (2013.01); *H01H 19/115* (2013.01); *H01H 19/14* (2013.01)

(58) Field of Classification Search
CPC ........ H01H 19/14; H01H 3/08; H01H 3/0213; F16H 21/06; F16H 21/44
See application file for complete search history.

(56) References Cited

U.S. PATENT DOCUMENTS

2012/0298494 A1* 11/2012 Mahida .................... G05G 5/06
200/336

FOREIGN PATENT DOCUMENTS

| GB | 1147674 A | 4/1969 |
| JP | 2013-143268 A | 7/2013 |

OTHER PUBLICATIONS

International Search Report from International Application No. PCT/JP2013/005264 dated Dec. 3, 2013.

* cited by examiner

*Primary Examiner* — Thomas C Diaz
(74) *Attorney, Agent, or Firm* — Brundidge & Stanger, P.C.

(57) ABSTRACT

A rotary electric component includes: a spring; a rotation body; click pieces; a lever restricting rotation of the rotation body, and has a following part in which a groove is formed and which has an arcuate recessed surface on a part of the lateral surface; a restricting member which has a pin and a drive unit having an arcuate protruding surface as part of the lateral surface, and which constitutes a Geneva drive in which the pin engages in the groove of the lever to rotate the lever and, in a state where the pin has been removed from the groove of the lever, the arcuate protruding surface of the drive unit and the arcuate recessed surface of the following part of lever engage to restrict rotation of the lever; and a housing unit comprising an uneven portion and housing the rotation body, click pieces, lever, and restricting member.

4 Claims, 11 Drawing Sheets

ROTARY ELECTRIC COMPONENT

TECHNICAL FIELD

The present invention relates to a rotary electric part such as a rotary switch in which an operation shaft is turned for switching.

BACKGROUND ART

Conventionally, rotary switches for switching between a plurality of contact points have been widely used. For example, in a communication apparatus, a rotary switch is used for the purpose of providing functions such as power switching, volume adjustment, and channel change.

In the case where a rotary switch is used for the purpose of obtaining a function of power switching, the rotary switch is designed to provide a user with click feeling such that the user surely recognizes on/off of the power source.

For example, PTL 1 discloses a rotary on/off control switch which can provide click feeling each time the power is turned on, or off. FIG. 9 and FIG. 10 are exploded assembly drawings of rotary on/off control switch 100 disclosed in PTL 1.

Rotary on/off control switch 100 includes knob 101, shaft 102, casing 103, driving member 104, carrier member 105, friction member 106, adaptable member 107, lever 108, and plate 109.

Here, knob 101 is coupled with shaft 102, and shaft 102 is coupled with driving member 104. Therefore, when knob 101 is rotated, driving member 104 is rotated. Driving member 104 is provided with drive pin 110, and drive pin 110 is engaged with groove 111 formed at a lower portion of lever 108 (see FIG. 10). With this configuration, when driving member 104 rotates, lever 108 rotates.

Likewise, groove 112 is formed at an upper portion of lever 108. Groove 112 is engaged with carrier pin 113 provided in carrier member 105. With this configuration, when lever 108 rotates, carrier member 105 rotates.

Here, abrasion member 106 is pressed by adaptable member 107 against moderating mechanism 114 formed in casing 103. Accordingly, when knob 101 is turned by a user, carrier member 105 is rotated, and thus the user can fell click feeling.

FIG. 11 is an exploded assembly drawing of rotary on/off control switch 200 disclosed in PTL 1. Rotary on/off control switch 200 includes knob 201, shaft 202, casing 203, driving member 204, carrier member 205, friction member 206, lever 207, and plate 208.

Knob 201 is coupled with shaft 202, and shaft 202 is coupled with driving member 204. Therefore, when knob 201 rotates, driving member 204 rotates. Driving member 204 is provided with hook mechanism 209, and hook mechanism 209 is engaged with lever pin 210 provided at a lower portion of lever 207. With this configuration, when driving member 204 rotates clockwise, lever 207 rotates counterclockwise.

On the other hand, groove 211 is formed at an upper portion of lever 207. Groove 211 is engaged with carrier pin 212 provided in carrier member 205. With this configuration, when lever 207 rotates, carrier member 205 rotates.

Here, abrasion member 206 is pressed by an adaptable member not illustrated against moderating mechanism 213 formed in casing 203. Accordingly, when knob 201 is turned by a user, carrier member 205 is rotated, and thus the user can feel click feeling.

CITATION LIST

Patent Literature

PTL 1

U.S. Patent Application Publication No. 2012/0298494

SUMMARY OF INVENTION

Technical Problem

However, the conventional technology disclosed in PTL 1 has a problem with the durability of rotary on/off control switches 100 and 200.

To be more specific, in rotary on/off control switch 100 illustrated in FIG. 9 and FIG. 10, driving member 104 and lever 108 are coupled with each other with drive pin 110. When knob 101 is greatly rotated counterclockwise, drive pin 110 is disengaged from groove 111 formed at a lower portion of lever 108. Then, when knob 101 rotates clockwise, drive pin 110 is again engaged with groove 111.

Here, lever 108 and carrier member 105 are coupled with each other when carrier pin 113 is engaged with groove 112 formed at an upper portion of lever 108. However, in the case where the wall surface of groove 112 has been abraded, when knob 101 is greatly rotated counterclockwise and drive pin 110 is disengaged from groove 111 formed at a lower portion of lever 108, carrier pin 113 may also be disengaged from groove 112.

In this case, the rotation angle of lever 108 is destabilized, and when knob 101 rotates clockwise, drive pin 110 may strike against the side surface of lever 108, and drive pin 110 may be damaged.

On the other hand, in rotary on/off control switch 200 illustrated in FIG. 11, driving member 204 and lever 207 are coupled with each other with lever pin 210. Also in this case, when knob 201 forcefully rotates clockwise, lever pin 210 may severely strike against the wall surface of hook mechanism 209 formed in driving member 204 and lever pin 210 may be damaged.

To solve the above-described problems, an object of the present invention is to provide a rotary electric part which can readily prevent an engaging portion of a driving member and a lever from being damaged.

Solution to Problem

A rotary electric part of the present invention includes: a spring; a rotational body having a recessed portion for housing the spring; a click piece configured to be rotated along with the rotational body, and biased by the spring toward outside of the rotational body; a lever configured to restrict rotation of the rotational body and including a driven portion provided with a groove, a part of a side surface of the driven portion being an arc-like recessed surface; a restriction member including a driving portion and a pin, a part of a side surface of the driving portion being an arc-like projecting surface, the restriction member being configured to serve as a Geneva mechanism in which the pin is engaged with the groove of the lever to rotate the lever, and, in a state where the pin is disengaged from the groove of the lever, the arc-like projecting surface of the driving portion and the arc-like recessed surface of the driven portion of the lever are engaged with each other to restrict rotation of the lever; and a housing portion including an irregular portion against which a click piece is pressed by the spring, the irregular portion being provided in a circumferential direction on an inner peripheral surface of the housing portion, the housing portion being configured to house the rotational body, the click piece, the lever, and the restriction member.

A rotary electric part of the present invention includes: a spring; a rotational body having a recessed portion for housing the spring; a click piece configured to be rotated along with the rotational body, and biased by the spring toward outside of the rotational body; a lever including a pin and a driven portion having a plate shape configured to support the pin, the lever being configured to restrict rotation of the rotational body; a restriction member including a driving portion provided with a groove, a part of a side surface of the driving portion being an arc-like projecting surface, the restriction member operates such that the driven portion having the plate shape of the lever is engaged with the groove to rotate the lever, and, in a state where the driven portion having the plate shape of the lever is disengaged from the groove, slide movement of the arc-like projecting surface of the driving portion and the driven portion having the plate shape of the lever is caused to restrict rotation of the lever; and a housing portion including an irregular portion against which a click piece is pressed by the spring, the irregular portion being provided in a circumferential direction on an inner peripheral surface of the housing portion, the housing portion being configured to house the rotational body, the click piece, the lever, and the restriction member.

Advantageous Effects of Invention

According to the present invention, it is possible to provide a rotary electric part which can readily prevent an engaging portion of a driving member and a lever from being damaged.

DESCRIPTION OF EMBODIMENTS

In the following, embodiments of the present invention will be described in detail with reference to the accompanying drawings.

Embodiment 1

Figure 1:
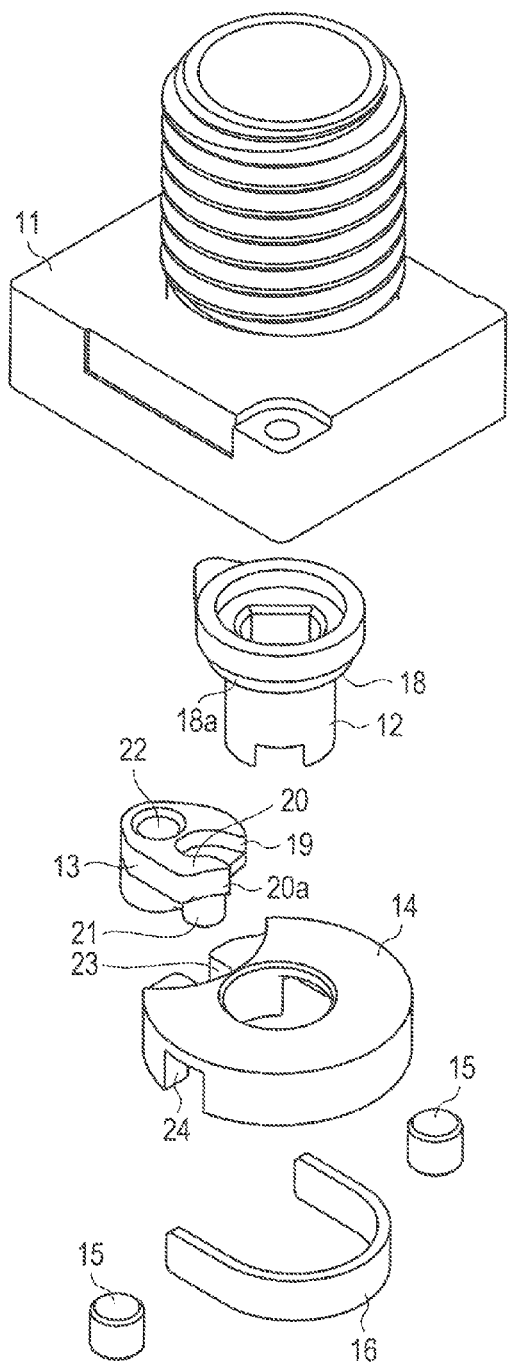
FIG. 1 is an exploded assembly drawing illustrating an exemplary configuration of a rotary electric part according to Embodiment 1 of the present invention.
Figure 2:
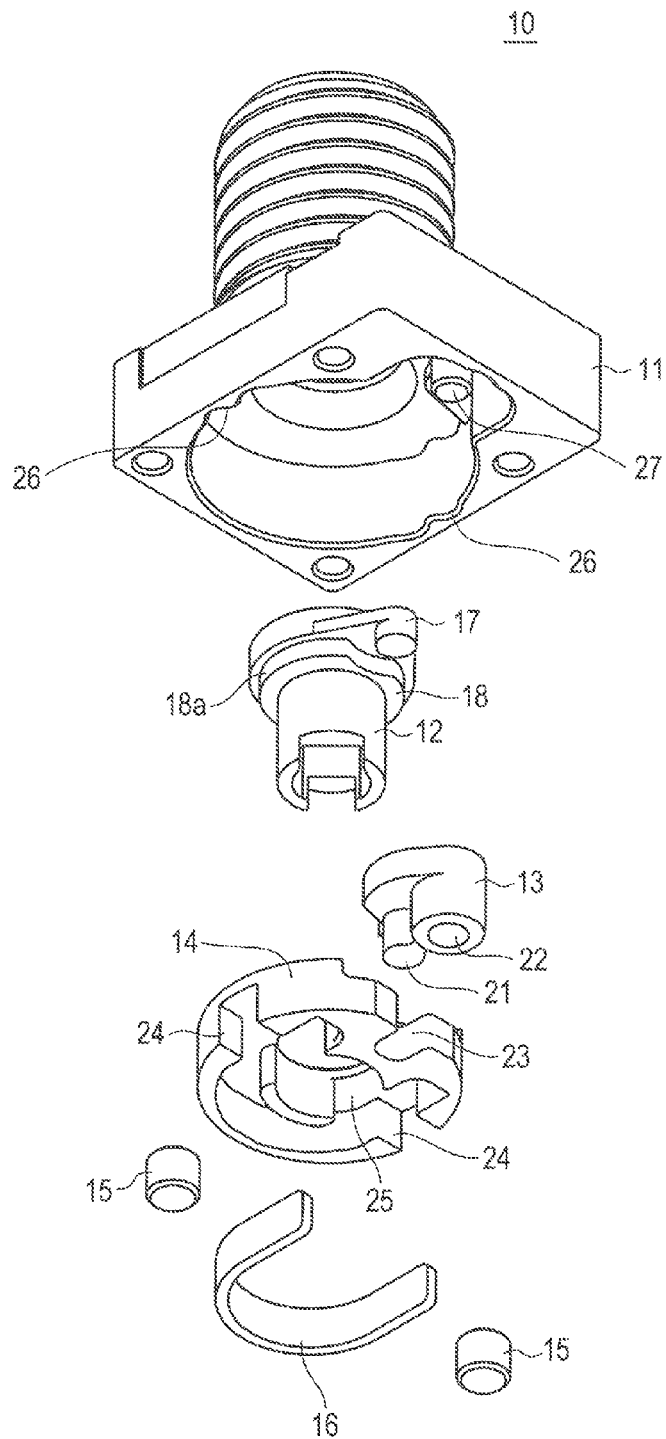
FIG. 2 is an exploded assembly drawing illustrating an exemplary configuration of the rotary electric part according to Embodiment 1 of the present invention.

FIG. 1 and FIG. 2 are exploded assembly drawings illustrating an exemplary configuration of rotary electric part 10 according to Embodiment 1 of the present invention. Rotary electric part 10 is a member such as a rotary switch that causes a click feeling when a knob not illustrated is turned, for example.

This rotary electric part 10 includes housing portion 11, restriction member 12, lever 13, rotational body 14, click piece 15, and spring 16.

Housing portion 11 is a member that houses restriction member 12, lever 13, rotational body 14, click piece 15, and spring 16. Housing portion 11 includes irregular portion 26 against which click piece 15 is pressed by spring 16, and support column 27 to which lever 13 is rotatably attached (see FIG. 2).

Restriction member 12 is a member that restricts the rotation of lever 13. Restriction member 12 is coupled with a shaft not illustrated, and rotates along with the rotation of the shaft. The shaft is coupled with a knob not illustrated which is rotated by the user when performing on/off of the power, volume adjustment, channel change and the like, for example. Restriction member 12 and lever 13 are combined to form a Geneva mechanism.

To be more specific, restriction member 12 includes pin 17 and driving portion 18. A part of the side surface of driving portion 18 is arc-like projecting surface 18a.

In addition, lever 13 includes pin 21, support column hole portion 22, and driven portion 20 a part of the side surface of which is arc-like recessed surface 20a and which is provided with groove 19. When support column hole portion 22 is engaged with support column 27 of housing portion 11, lever 13 is rotatably attached to housing portion 11.

Further, when restriction member 12 is rotated, and pin 17 is engaged with groove 19 of lever 13, lever 13 rotates around support column 27. On the other hand, in the state where pin 17 is disengaged from groove 19 of lever 13, arc-like projecting surface 18a of driving portion 18 of restriction member 12 and arc-like recessed surface 20a of driven portion 20 of lever 13 are engaged with each other, and rotation of lever 13 around support column 27 is restricted. The operation of such a Geneva mechanism will be described in detail with reference to FIGS. 3A, 3B, 3C, and 3D, and FIGS. 4A, 4B, 4C, and 4D.

In rotational body 14, groove 23, opening portion 24, and recessed portion 25 are formed. Groove 23 is engaged with pin 21 of lever 13. When lever 13 rotates around support column 27, rotational shaft 14 also rotates around the central axis of rotational body 14.

In addition, click piece 15 is disposed at opening portion 24. In addition, spring 16 is disposed at recessed portion 25 in such a manner as to bias click piece 15 toward the outside of rotational body 14. With this configuration, click piece 15 is pressed against irregular portion 26 of housing portion 11, and thus click feeling is obtained when rotational body 14 rotates.

Figure 3:
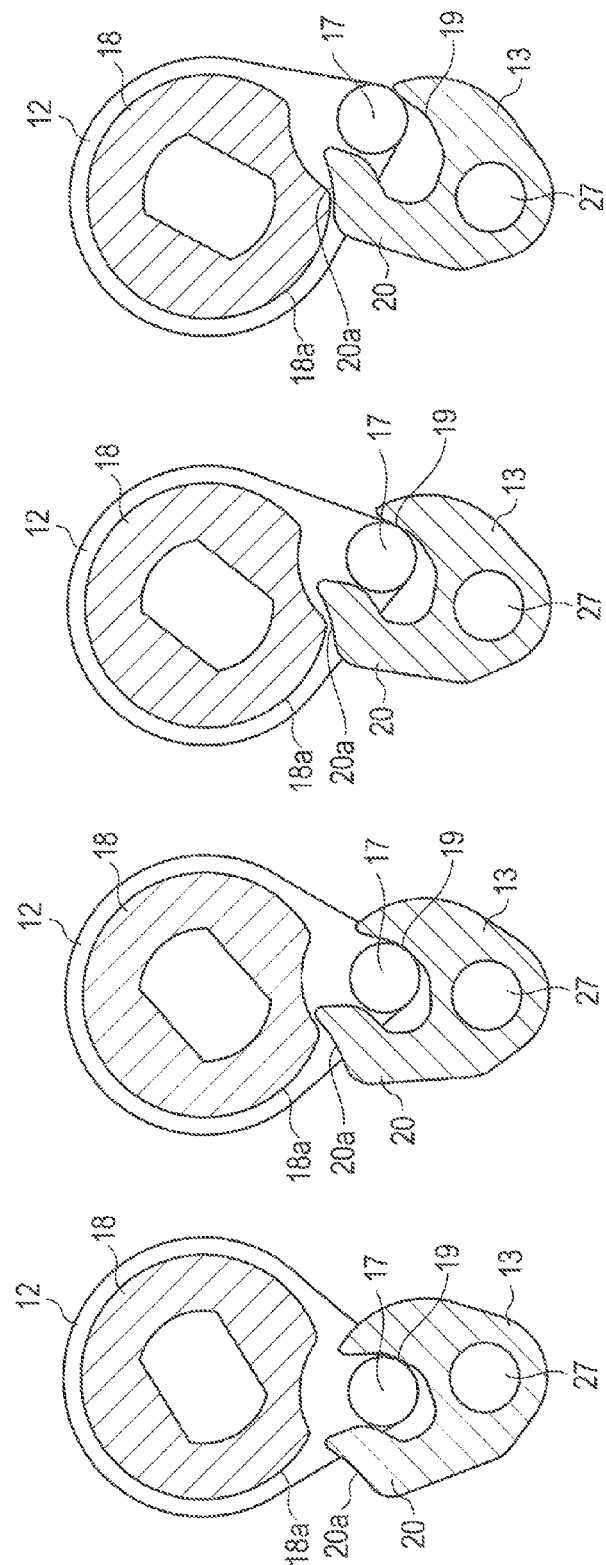
FIGS. 3A, 3B, 3C, and 3D illustrate an exemplary operation of a Geneva mechanism at the time when a pin of a restriction member is disengaged from a groove of a lever.

Next, an operation of the Geneva mechanism of rotary electric part 10 is described. FIGS. 3A, 3B, 3C, and 3D illustrate an exemplary operation of the Geneva mechanism at the time when pin 17 of restriction member 12 is disengaged from groove 19 of lever 13. FIG. 3B to FIG. 3D illustrate states where restriction member 12 is rotated counterclockwise from the state illustrated in FIG. 3A by 10 degrees, 20 degrees, and 30 degrees, respectively.

As illustrated in FIG. 3A to FIG. 3D, when restriction member 12 rotates counterclockwise, pin 17 of restriction member 12 pushes the right wall surface of groove 19 of lever 13. With this configuration, lever 13 rotates clockwise around support column 27.

Then, when pin 17 is disengaged from groove 19 of lever 13 after the state of FIG. 3D, lever 13 does not rotate even when restriction member 12 rotates. In addition, arc-like projecting surface 18a of driving portion 18 of restriction member 12 and arc-like recessed surface 20a of driven portion 20 of lever 13 are engaged with each other, and rotation of lever 13 around support column 27 is suppressed.

That is, since lever 13 does not rotate more than this, rotational body 14 illustrated in FIG. 1 and FIG. 2 also does not rotate more than this, and thus the number of click feeling generated by click piece 15 and irregular portion 26 is limited to one time.

Figure 4:
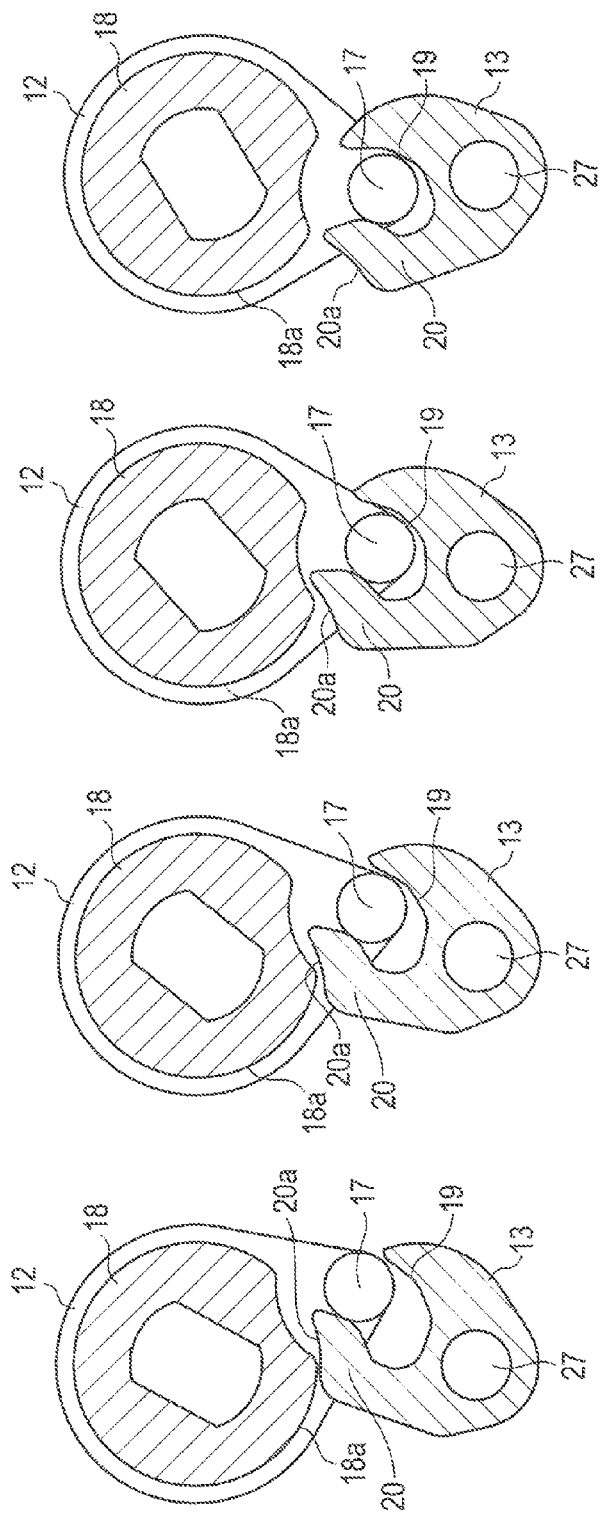
FIGS. 4A, 4B, 4C, and 4D illustrate an exemplary operation of the Geneva mechanism at the time when the pin of the restriction member is engaged with the groove of the lever.

FIG. 4A to FIG. 4D illustrate an exemplary operation of the Geneva mechanism at the time when pin 17 of restriction member 12 is engaged with groove 19 of lever 13. FIG. 4B to FIG. 4D illustrate the states where restriction member 12 is rotated clockwise from the state illustrated in of FIG. 4A by 10 degrees, 20 degrees, and 30 degrees, respectively. It is to be noted that the state of FIG. 4D is the same as the state of FIG. 3A.

As illustrated in FIG. 4A to FIG. 4D, when restriction member 12 rotates clockwise, pin 17 is engaged with groove 19 of lever 13. At this time, pin 17 pushes the left wall surface of groove 19 of lever 13 and lever 13 rotates counterclockwise around support column 27. Consequently, rotational body 14 rotates clockwise, and click piece 15 and irregular portion 26 generate click feeling only one time.

Here, groove 19 may be formed such that, in the state where pin 17 is engaged with groove 19 of lever 13, the normal direction of the wall surface of groove 19 of lever 13 making contact with pin 17 is oblique to the movement direction of pin 17.

Figure 5:
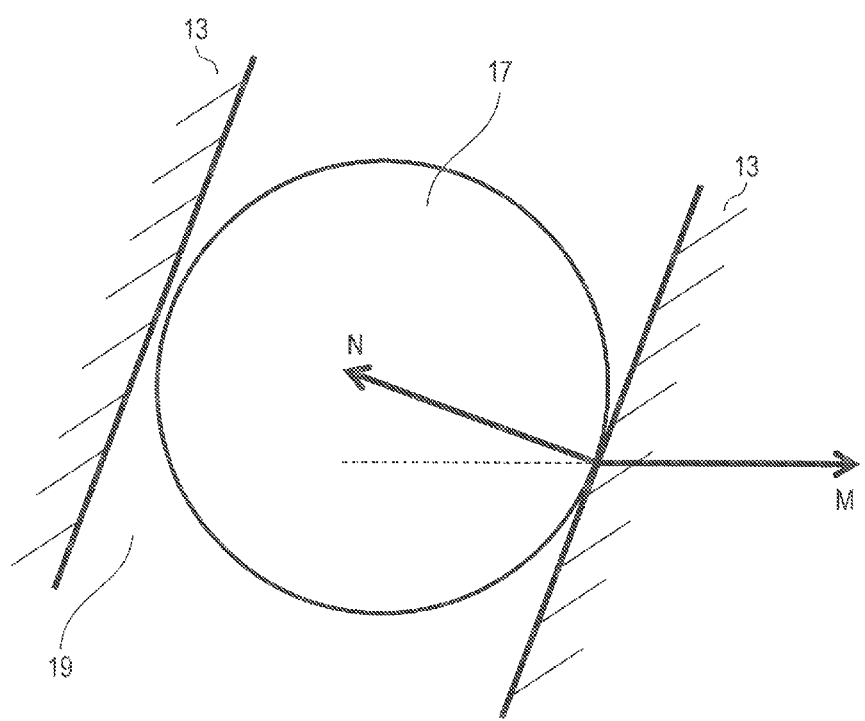
FIG. 5 illustrates a relationship between normal direction N of the wall surface of the groove of the lever making contact with the pin and movement direction M of the pin.

FIG. 5 illustrates a relationship between the normal direction N of the wall surface of groove 19 of lever 13 making contact with pin 17 and movement direction M of pin 17. For example, the wall surface of groove 19 is formed such that the normal direction of the wall surface of groove 19 of lever 13 making contact with pin 17 is not at 180 degrees relative to the movement direction of pin 17 at the time point of start of rotation of lever 13 illustrated in FIG. 3A. With this configuration, the force required for starting the rotation of lever 13 can be reduced.

In addition, the wall surface of groove 19 may be formed such that the normal direction of the wall surface of groove 19 of lever 13 making contact with pin 17 is oblique to the movement direction of pin 17 in each state illustrated in FIG. 3B to FIG. 3D and FIG. 4A to FIG. 4C after the start of rotation of lever 13, in addition to the state of FIG. 3A. With this configuration, the force required for continuing the rotation of lever 13 can be reduced.

Further, the wall surfaces of groove 19 that sandwich lever 13 may be disposed parallel to each other, and pin 17 may be housed with play between the parallel wall surfaces.

With this configuration, the rotational positions of lever 13 where click feeling is obtained can be set to substantially the same position between the case where pin 17 is disengaged from groove 19 of lever 13 and the case where pin 17 is engaged with groove 19 of lever 13. Thus, the user can operate the knob without feeling wrongness.

In addition, with the above-mentioned configuration, substantially the same relationship between the movement direction of lever 13 and the normal direction the wall surface of groove 19 in contact with lever 13 as illustrated in FIG. 5 can be obtained between the case where pin 17 is disengaged from groove 19 of lever 13 and the case where pin 17 is engaged with groove 19 of lever 13.

As a result, the force required for rotating lever 13 at the time when pin 17 is disengaged from groove 19 of lever 13 and the force required for rotating lever 13 at the time when pin 17 is engaged with groove 19 of lever 13 can be set to substantially the same value. Also with this configuration, the user can operate the knob without feeling of wrongness.

As described above, according to Embodiment 1, in the state where pin 17 is disengaged from groove 19 of lever 13, arc-like projecting surface 18a of driving portion 18 and arc-like recessed surface 20a of driven portion 20 of lever 13 are engaged with each other to form the Geneva mechanism that restricts the rotation of lever 13.

Thus, pin 17 which is a part for engaging restriction member 12 and lever 13 can be prevented from striking against the side surface of lever 13 and being broken when pin 17 is again engaged with groove 19 after being disengaged from groove 19 of lever 13.

Embodiment 2

Figure 6:
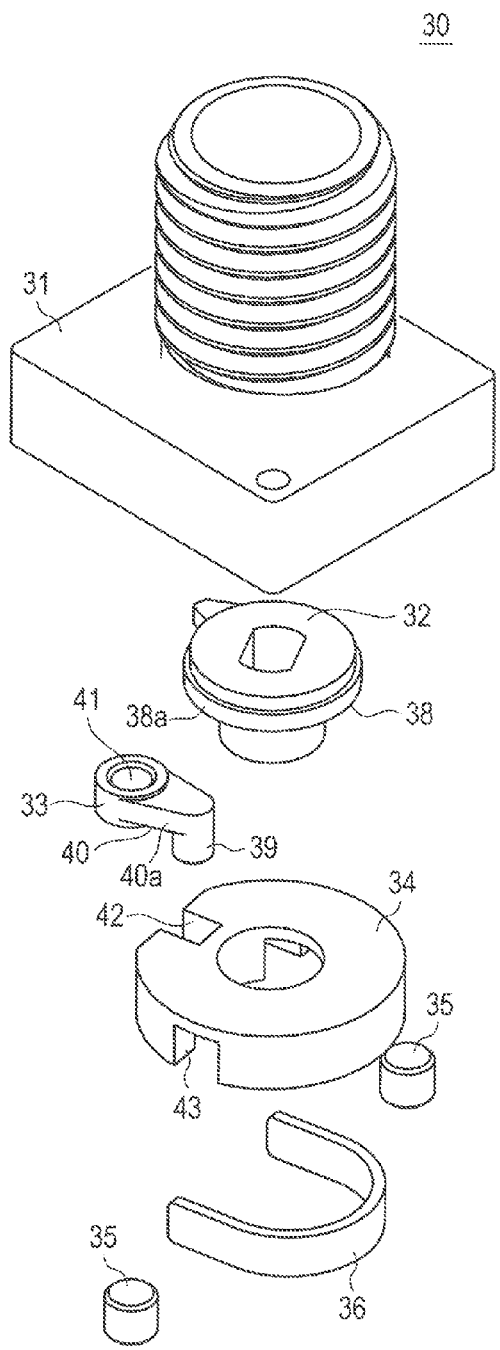
FIG. 6 is an exploded assembly drawing illustrating an exemplary configuration of a rotary electric part according to Embodiment 2 of the present invention.
Figure 7:
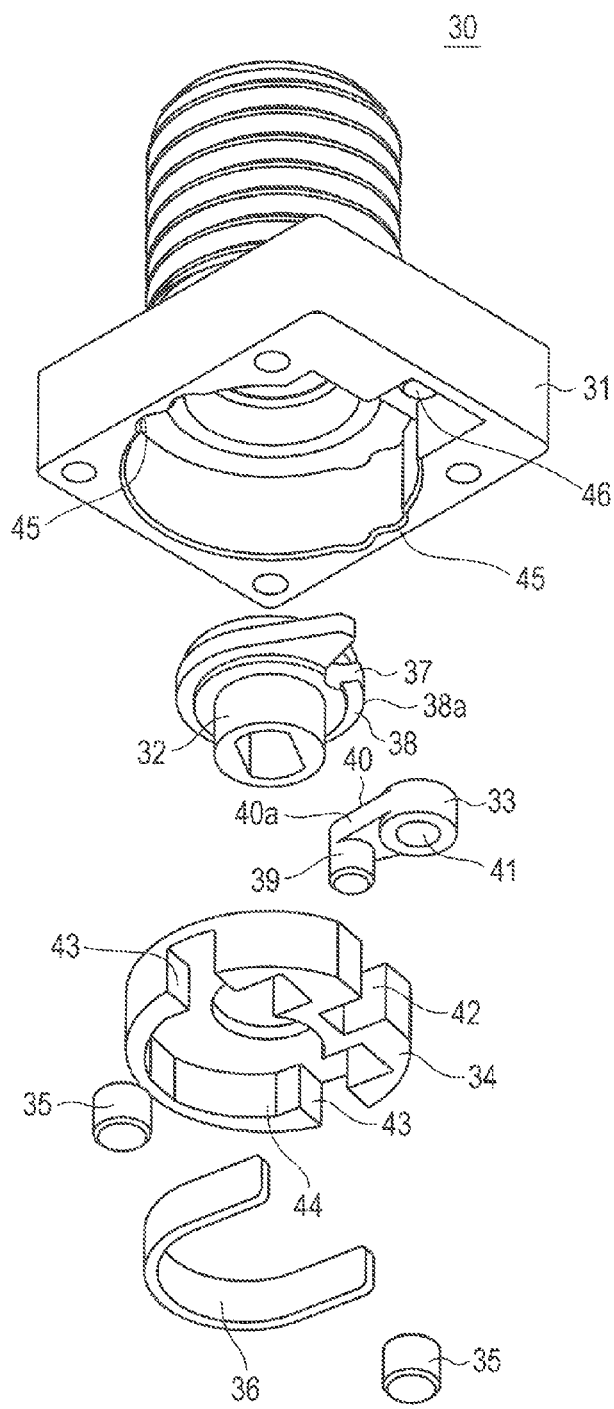
FIG. 7 is an exploded assembly drawing illustrating an exemplary configuration of the rotary electric part according to Embodiment 2 of the present invention.

FIG. 6 and FIG. 7 are exemplary exploded assembly drawings illustrating a configuration of rotary electric part 30 according to Embodiment 2 of the present invention. As with rotary electric part 30 according to Embodiment 1, rotary electric part 30 is a member such as a rotary switch that causes a click feeling when a knob not illustrated is turned.

Rotary electric part 30 includes housing portion 31, restriction member 32, lever 33, rotational body 34, click piece 35, and spring 36.

Housing portion 31 is a member that houses restriction member 32, lever 33, rotational body 34, click piece 35, and spring 36. Housing portion 31 includes irregular portion 45 against which click piece 35 is pressed by spring 36, and support column 46 to which lever 33 is rotatably attached (see FIG. 7).

Restriction member 32 is a member that restricts rotation of lever 33. Restriction member 32 is coupled with a shaft not illustrated, and rotates along with the rotation of the shaft. The shaft is coupled with a knob not illustrated which is rotated by the user when performing on/off of the power, volume adjustment, channel change and the like, for example.

To be more specific, restriction member 32 includes driving portion 38 a part of the side surface of which is an arc-like projecting surface 38a and which is provided with groove 37. In addition, lever 33 includes pin 39, driven portion 40 having a plate shape that supports pin 39, and support column hole portion 41. When support column hole portion 41 is engaged with support column 46 of housing portion 31, lever 33 is rotatably attached to housing portion 31.

Further, when restriction member 32 is rotated, and an end portion of plate-shaped driven portion 40 of lever 33 is engaged with groove 37 of restriction member 32, lever 33 is rotated around support column 46. On the other hand, when the end portion of plate-shaped driven portion 40 is disengaged from groove 37 of restriction member 32, slide movement between arc-like projecting surface 38a of driving portion 38 and side surface 40a of plate-shaped driven portion 40 is caused, and thus the rotation of lever 33 around support column 46 is restricted. The operation of this rotation mechanism will be described in detail with reference to FIG. 8A to FIG. 8D.

Rotational body 34 is provided with groove 42, opening portion 43, and recessed portion 44. Groove 42 is engaged with pin 39 of lever 33. When lever 33 rotates around support column 46, rotational body 34 also rotates around the central axis of rotational body 34.

In addition, click piece 35 is disposed at opening portion 43. Spring 36 is disposed at recessed portion 44 such that click piece 35 is biased toward the outside of rotational body 34. With this configuration, click piece 35 is pressed against irregular portion 45 of housing portion 31, and thus click feeling is obtained when rotational body 34 rotates.

Next, an operation of the rotation mechanism of rotary electric part 30 is described. FIGS. 8A, 8B, 8C, and 8D illustrate an exemplary operation of the rotation mechanism of rotary electric part 30. In FIGS. 8A, 8B, 8C, and 8D, restriction member 32 is disposed behind rotational body 34 and is therefore illustrated with a dotted line.

Figure 8A:
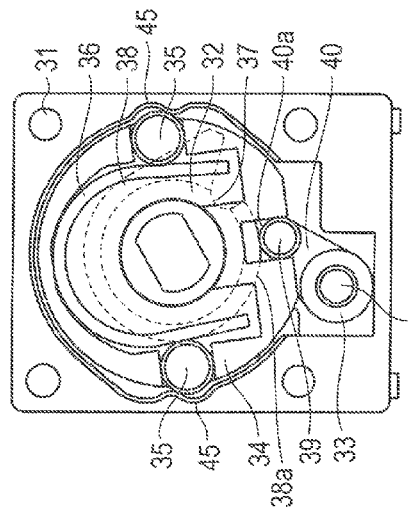
FIGS. 8A, 8B, 8C, and 8D illustrate an exemplary operation of a rotation mechanism of the rotary electric part.
Figure 8B:
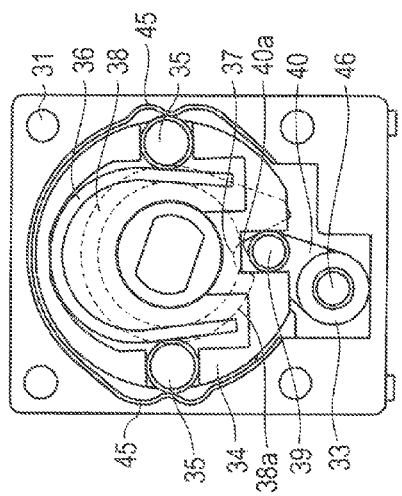
Figure 8C:
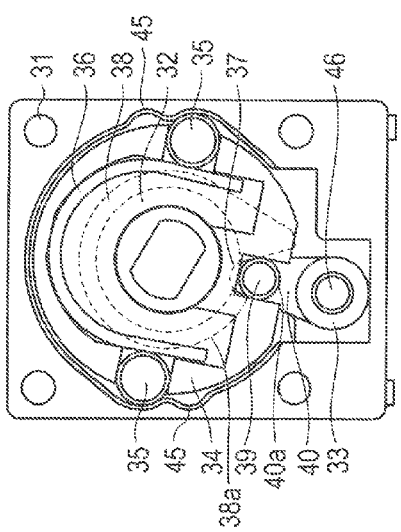
Figure 8D:
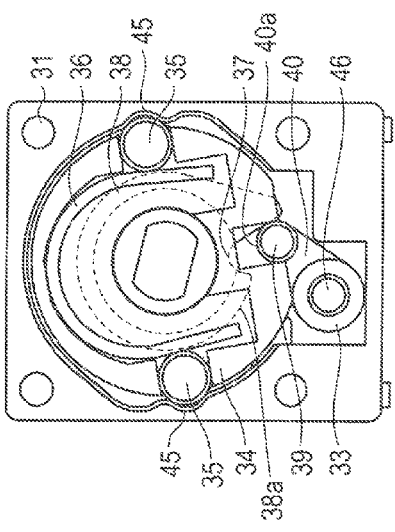
Figure 9:
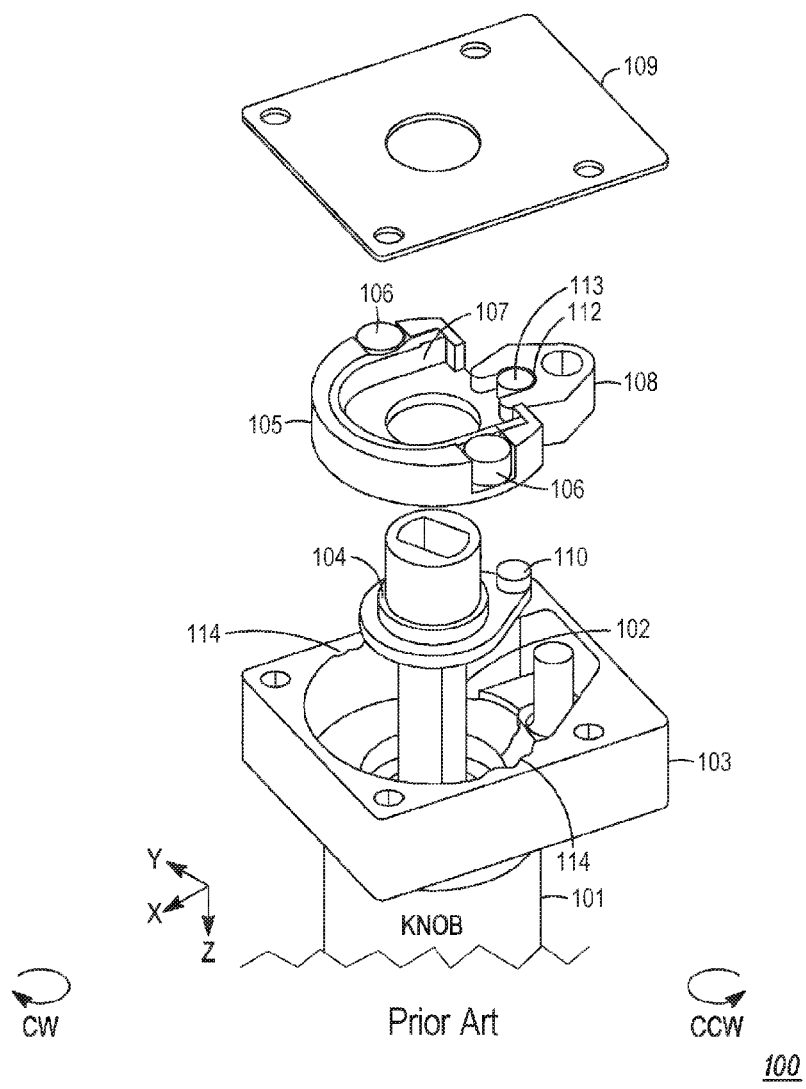
FIG. 9 is an exploded assembly drawing of a rotary on/off control switch disclosed in PTL 1.
Figure 10:
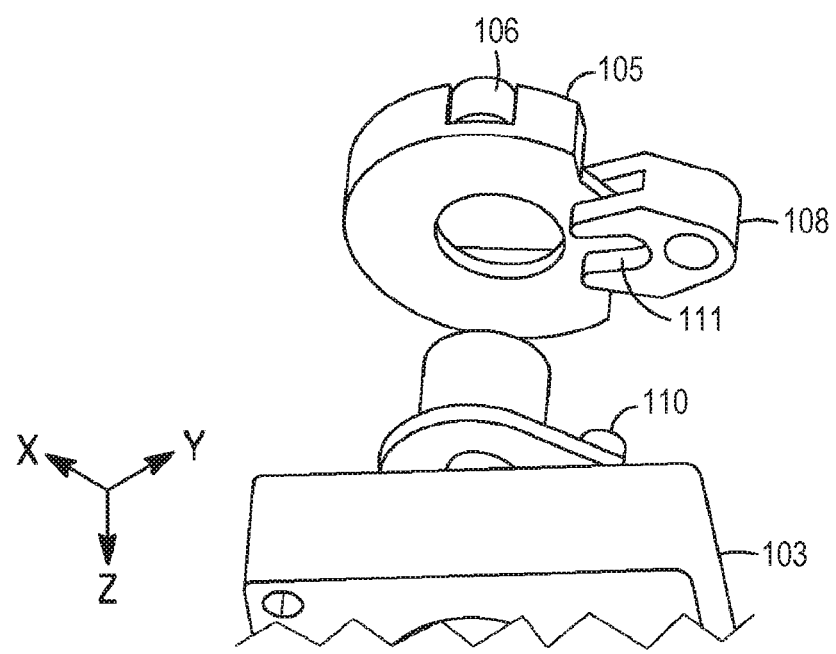
FIG. 10 is an exploded assembly drawing of the rotary on/off control switch disclosed in PTL 1.
Figure 11:
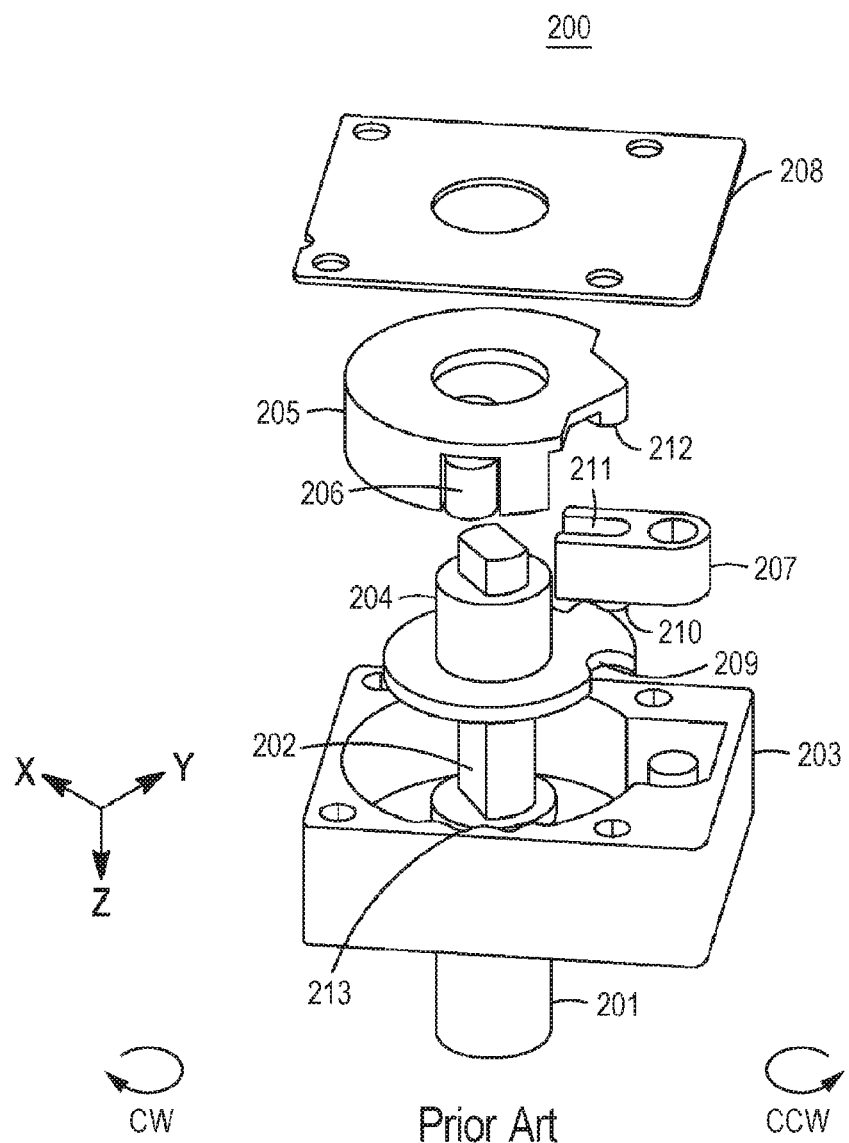
FIG. 11 is an exploded assembly drawing of another rotary on/off control switch disclosed in PTL 1.

FIG. 8A and FIG. 8B illustrate an operation of the rotation mechanism at the time when the end portion of plate-shaped driven portion 40 of lever 33 is disengaged from groove 37 of restriction member 32. In addition, FIG. 8C and FIG. 8D illustrate an operation of the rotation mechanism at the time when the end portion of plate-shaped driven portion 40 of lever 33 is engaged with groove 37 of restriction member 32.

As illustrated in FIG. 8A and FIG. 8B, when restriction member 32 rotates counterclockwise, the end portion of plate-shaped driven portion 40 of lever 33 is engaged with groove 37 of restriction member 32, and therefore lever 33 rotates clockwise around support column 46.

When the end portion of plate-shaped driven portion 40 of lever 33 is disengaged from groove 37 as illustrated in FIG. 8B, lever 33 does not rotate even when rotational body 34 is rotated. Moreover, slide movement between arc-like projecting surface 38a of driving portion 38 of restriction member 32 and side surface 40a of plate-shaped driven portion 40 of lever 33 is caused, and rotation of lever 33 around support column 46 is suppressed.

That is, since lever 33 does not rotate more than this, rotational body 34 also does not rotate more than this, and thus the number of click generated by click piece 35 and irregular portion 45 is limited to one time.

In addition, when restriction member 32 rotates clockwise as illustrated in FIGS. 8C and 8D, the end portion of plate-shaped driven portion 40 of lever 33 is engaged with groove 37 of restriction member 32. At this time, lever 33 rotates counterclockwise around support column 46. Consequently, rotational body 34 also rotates counterclockwise, and thus click is generated by click piece 35 and irregular portion 45 one time.

As described above, according to Embodiment 2, groove 37 of restriction member 32 is engaged with plate-shaped driven portion 40 of lever 33 to rotate engaged lever 33, and, in the state where plate-shaped driven portion 40 of lever 33 is disengaged from groove 37, slide movement between arc-like projecting surface 38a of driving portion 38 and side surface 40a of plate-shaped driven portion 40 of lever 33 is caused to restrict the rotation of lever 33.

That is, according to Embodiment 2, restriction member 32 and lever 33 are engaged with each other using plate-shaped driven portion 40, without using a pin. With this configuration, it is possible to easily prevent the engaging portion of restriction member 32 and lever 33 from being damaged.

INDUSTRIAL APPLICABILITY

The rotary electric part according to the present invention is suitable for rotary electric parts which are required to easily prevent the damage of the engaging portion between the driving member and the lever.

REFERENCE SIGNS LIST 10, 30 Rotary electric part
11, 31 Housing portion
12, 32 Restriction member
13, 33, 108 Lever
14, 34 Rotational body
15, 35 Click piece
16, 36 Spring
17, 21, 39 Pin
18, 38 Driving portion
18a, 38a Arc-like projecting surface
19, 23, 37, 42 Groove
20 Driven portion
20a Arc-like recessed surface
22, 41 Support column hole portion
24, 43 Opening portion
25, 44 Recessed portion
26, 45 Irregular portion
27, 46 Support column
40 Plate-shaped driven portion
40a Side surface
100 Rotary on/off control switch
101 Knob
102 Shaft
103 Casing
104 Driving member
105 Carrier member
106 Friction member
107 Adaptable member
109 Plate

The invention claimed is:
1. A rotary electric part comprising:
a spring;
a rotational body having a recessed portion for housing the spring;
a click piece configured to be rotated along with the rotational body, and biased by the spring toward outside of the rotational body;
a lever configured to restrict rotation of the rotational body and including a driven portion provided with a groove, a part of a side surface of the driven portion being an arc-like recessed surface;
a restriction member including a driving portion and a pin, a part of a side surface of the driving portion being an arc-like projecting surface, the restriction member being configured to serve as a Geneva mechanism in which the pin is engaged with the groove of the lever to rotate the lever, and, in a state where the pin is disengaged from the groove of the lever, the arc-like projecting surface of the driving portion and the arc- like recessed surface of the driven portion of the lever are engaged with each other to restrict rotation of the lever; and a housing portion including an irregular portion against which a click piece is pressed by the spring, the irregular portion being provided in a circumferential direction on an inner peripheral surface of the housing portion, the housing portion being configured to house the rotational body, the click piece, the lever, and the restriction member.

2. The rotary electric part according to claim 1, wherein, in the groove of the lever, a normal direction of a wall surface which makes contact with the pin is oblique to a movement direction of the pin.

3. The rotary electric part according to claim 2, wherein:

the groove of the lever includes wall surfaces disposed parallel to each other, and the pin is housed with play between the wall surfaces disposed parallel to each other.

4. A rotary electric part comprising:

a spring;

a rotational body having a recessed portion for housing the spring;

a click piece configured to be rotated along with the rotational body, and biased by the spring toward outside of the rotational body;

a lever including a pin and a driven portion having a plate shape configured to support the pin, the lever being configured to restrict rotation of the rotational body;

a restriction member including a driving portion provided with a groove, a part of a side surface of the driving portion being an arc-like projecting surface, the restriction member operates such that the driven portion having the plate shape of the lever is engaged with the groove to rotate the lever, and, in a state where the driven portion having the plate shape of the lever is disengaged from the groove, slide movement of the arc-like projecting surface of the driving portion and the driven portion having the plate shape of the lever is caused to restrict rotation of the lever; and a housing portion including an irregular portion against which a click piece is pressed by the spring, the irregular portion being provided in a circumferential direction on an inner peripheral surface of the housing portion, the housing portion being configured to house the rotational body, the click piece, the lever, and the restriction member.

* * * * *